United States Patent [19]

Weise et al.

[11] Patent Number: 5,400,946
[45] Date of Patent: Mar. 28, 1995

[54] METHOD FOR SOLDERING HARD SUBSTANCES ONTO STEELS

[75] Inventors: Wolfgang Weise, Frankfurt am Main; Harald Krappitz, Hanau; Willi Malikowski, Aschaffenburg, all of Germany

[73] Assignee: Degussa Aktiengesellschaft, Frankfurt am Main, Germany

[21] Appl. No.: 141,740

[22] Filed: Oct. 27, 1993

[30] Foreign Application Priority Data

Oct. 28, 1992 [DE] Germany ............. 42 36 383.7
Oct. 4, 1993 [DE] Germany ............. 43 33 798.8

[51] Int. Cl.$^6$ .................... B23K 1/19; B23K 35/28
[52] U.S. Cl. ........................ 228/122.1; 228/56.3; 428/576; 428/671; 428/674; 148/516; 148/528
[58] Field of Search .............. 228/56.3, 122.1, 208, 228/231, 262.8; 148/516, 528, 536; 428/576, 671, 674

[56] References Cited

U.S. PATENT DOCUMENTS

| | | | |
|---|---|---|---|
| 3,392,899 | 7/1968 | Hoogstoel | 228/56.3 |
| 3,444,613 | 5/1969 | Foerster | 228/122.1 |
| 3,667,644 | 6/1972 | Fortmann | 220/89.2 |
| 3,949,122 | 4/1976 | Lepetit et al. | 228/209 |
| 4,340,650 | 7/1982 | Pattaik et al. | 428/675 |
| 4,562,121 | 12/1985 | Thiemann et al. | 228/56.3 |
| 5,172,780 | 12/1992 | Batliner et al. | 228/56.3 |

FOREIGN PATENT DOCUMENTS 0487447 5/1992 European Pat. Off. .
863737 1/1953 Germany .

OTHER PUBLICATIONS

Patent Abstracts of Japan, Publ. No. JP4169244, Publ. Date Jun. 17, 1992, Manufacturing of Wire dot Printing Head.
Patent Abstracts of Japan, Publ. No. JP63114984, Publ. Date May 19, 1988, Spectacles Frame Member having Tubular Structure.
Metals Handbook Ninth Edition, vol. 2, "Heat Treating of Copper and Copper Alloys", pp. 252–260, copy 1979.

*Primary Examiner*—Samuel M. Heinrich
*Attorney, Agent, or Firm*—Beveridge DeGrandi, Weilacher & Young

[57] ABSTRACT

When hard-substance parts are soldered onto steel bases, thermal stresses are produced between the hard substance and the steel. These stresses can be reduced by means of using a multilayer solder in which the middle layer consists of a precipitation-hardenable copper alloy or nickel alloy provided on both sides with a layer of a hard-solder alloy whose working temperature is at least 50° C. below the melting point of the precipitation-hardenable copper alloy or nickel alloy. A tempering treatment at 250° to 550° C. is carried out after the soldering in order to achieve a precipitation hardening of the middle layer.

9 Claims, No Drawings

METHOD FOR SOLDERING HARD SUBSTANCES ONTO STEELS

INTRODUCTION AND BACKGROUND

The present invention relates to a method for soldering hard substances onto a base or substrate body formed of steel at temperatures above 570° C. using a three-layer solder. In carrying out the invention, the middle layer of the three-layer solder consists of a copper alloy or nickel alloy which is provided on both sides thereof with a layer of a hard solder whose working temperature is located at least 50° C. below the melting point of the copper alloy or nickel alloy of the middle layer.

Hard substances, especially cemented carbide and cermets are extensively used in cutting technology for fabrication of work tools used in working operations requiring cutting of wood, steel and stone. It is necessary for these purposes to connect the hard-substance parts to a base body of steel. This takes place as a rule by means of clamping connections or screw connections or, more preferably, by soldering.

When these working tools are used, high and complex stresses such as tensions of pressure, traction and shearing occur in the connection zone between the hard-metal part and base body. In addition, during soldering significant stresses arise during the cooling down period due to the different coefficients of thermal expansion. Such stresses can be compensated for by using solders which remain ductile. Ductile solders are known in the art such as, for example, CuMnNi alloys, CuMnCo alloys, CuMnSi alloys and AgCuZnMnNi alloys, which exhibit mechanical strengths sufficiently high for many applications. For extreme applications like those which can frequently occur in cutting technology, solders with greater strengths are required.

German OLS 40 36 777 teaches the use of precipitation-hardenable solders such as CuNiSi alloys, CuBe alloys, CuZr alloys or CuTi alloys, for connecting cemented carbide parts to base bodies or substances of steel. These solders exhibit a high ductility after cooling down and achieve a high mechanical strength after precipitation-hardening by means of a tempering treatment by heating.

However, a disadvantage of this method is the fact that on account of the high melting point of these precipitation-hardenable copper alloys high thermal stresses arise in the composite of hard metal and steel. This can result in failure of the structural part, especially in the case of hard metals with a low percentage of cobalt binder.

The term "precipitation hardening" as used herein is well understood in the art. Reference is made to The Encyclopedia of Chemical Technology by Kirk-Othomer, 3rd Edition, Volume 12, page 425 and Volume 15, page 335; incorporated herein by reference.

Multilayer solders are known in soldering technology. They are used, for example, to manufacture brittle, non-deformable solder parts by plating the ductile solder components onto each other and producing corresponding solder form parts. The actual solder alloy is not produced until during the melting of the laminated solder.

EP patent 677,012 teaches a three-layer solder consisting of an intermediate layer of steel, copper or copper-nickel alloy on which a solder layer is plated on both sides. The intermediate layer remains fixed during the soldering process and has the task of strengthening the solder connection in order to receive thermal tensions. This solder is also used for hard metal tools but still does not exhibit optimum strength values.

Multilayer solders are also described in U.S. Pat. No. 3,676,088 in which the intermediate layer consists of a copper alloy. These solders function as replacements for the brittle copper-phosphorus solders and are not used to solder hard metals onto steel.

A multilayer solder according to German patent 863 737 is known for soldering hard metals onto steel which solder consists of an intermediate layer of copper or nickel plated on both sides with a silver solder. The soldering is followed by a heat treatment in order to achieve a further diffusion between the silver and the metal of the intermediate layer. High hardness values can therefore not be achieved.

SUMMARY OF THE INVENTION

It is an object of the present invention to provide a method for soldering hard substances onto base bodies or substrates of steel at temperatures above 570° C. using a three-layer solder in which method the middle layer consists of a copper alloy or nickel alloy and is provided on both sides with a layer of a hard solder whose working temperature is at least 50° C. below the melting point of the copper alloy or nickel alloy of the middle layer.

This method is intended to achieve not only the high mechanical strength of a precipitation-hardenable solder alloy but also a reduction of the thermal tensions of the hard substance/steel composite.

Another object of the present invention is to provide a novel solder composite that overcomes prior art problems.

In attaining the above and other objects, the present invention solves this problem by selecting a three layer solder wherein a precipitation-hardenable copper layer or nickel layer is the middle layer of the composite and by controlling the melting of the intermediate layer so that the melting thereof is prevented during the soldering operation. Control is achieved by the selection of the working temperature and of the alloy and by a tempering treatment of heating at 250° to 550° C. following the soldering to achieve the precipitation hardening effect of the middle layer.

DETAILED DESCRIPTION OF THE INVENTION

In carrying out the present invention, a known precipitation-hardenable copper alloy or nickel alloy is used as the middle layer of a multilayer solder. A known hard solder is plated onto this middle layer on both sides, during which the working temperature of the plated-on solder must be at least 50° C. below the melting temperature of the precipitation-hardenable middle layer. Since the middle layer does not melt during the soldering process on account of the selection of the working temperature and of the alloy, the formation of a thicker solder layer can be achieved which distinctly reduces the thermal stress between the base body and the hard-substance part.

The essential advantage of the method of the invention using a multilayer solder with a precipitation-hardenable middle layer resides in that during the soldering process, which practically corresponds to a solution heat treatment of the precipitation-hardenable intermediate layer, the high ductility of the intermediate layer is preserved during the entire cooling-down phase.

Since the thermal stresses arise especially during the cooling down, the middle layer, which is present in a solution heat-treated state, can lower the thermal stresses to a large extent. One need only take care during the cooling down that the cooling down takes place so rapidly that no precipitations occur.

The precipitation-hardenable middle solder layer offers the possibility of increasing the mechanical strength of the solder compound without materially increasing the thermal stresses by means of a precipitation heating following the soldering process. Therefore, a very strong solder compound can be produced by the methods of the present invention which is at the same time a low-tension solder compound.

Those precipitation-hardenable copper alloys and nickel alloys are preferably selected as middle layers whose melting point is located far above the working temperature of the plated solder used and which exhibit tempering temperatures in a range of 250°–550° C.

For the middle layer of the multilayer solder, it is preferable to use copper alloys with admixtures of one or more of the metals or elements indium, chromium, beryllium, nickel, magnesium, scandium, silicon, tin, titanium, zirconium, hafnium and manganese or nickel alloys with admixtures of one or more of the metals aluminum, copper, titanium and beryllium.

In the copper alloys, copper is the major component. In the nickel alloys, nickel is the major component.

The following copper alloys have proven themselves as precipitation-hardenable middle solder layers:

Cu with 15 to 25% by weight Mn and 15 to 25% by weight Ni
Cu with 7 to 8.5% by weight Mn and 2 to 3% by weight Si
Cu with 0.4 to 2% by weight Cr
Cu with 0.4 to 1% by weight Hf and 0.3 to 0.5% by weight Zr
Cu with 0.1 to 0.4% by weight Zr
Cu with 0.5 to 2% by weight Ti
Cu with 6 to 10% by weight Ni and 6 to 10% by weight Sn
Cu with 1 to 2% by weight Ti, 2 to 3% by weight Si and 0.3 to 0.8% by weight Cr
Cu with 0.5 to 20% by weight In
Cu with 1 to 4% by weight Be
Cu with 1 to 3% by weight Ni and 0.4 to 0.8% by weight Si or nickel alloys
Ni with 2 to 6% by weight Al and 1 to 2% by weight titanium
Ni with 20 to 40% by weight Cu and 2 to 4% by weight Al
Ni with 1 to 3% by weight Be.

The following have proven themselves especially well for use as the middle layer: Cu with 20% Mn and 20% Ni, Cu with 7.65% Mn and 2.35% Si, Cu with 1% Ti, Cu with 2% Ni and 0.6% Ni with 4% Al and 11.5% Ti, Cu with 0.6% Cr, Cu with 0.2% Zr and Cu with 0.66% Hf and 0.04% Zr.

The following solder compositions have proven themselves as platable solder layers for use in making the three-layer composite with the middle layer:

Ag with 25 to 34% by weight Cu, 18 to 25% by weight Zn, 1 to 5% by weight Mn and 0.3 to 1% by weight Ni with a working temperature of 650° to 700° C.; Ag with 20 to 35% by weight Cu, 4 to 8% by weight In, 1 to 3% by weight Ni and 1 to 3% by weight Mn with working temperatures of 710° to 800° C.; Cu with 15 to 20% by weight Ag, 20 to 30% by weight Zn, 15 to 20% by weight Cd, 2 to 3% by weight Mn and 0.3 to 0.7% by weight Ni with working temperatures of 570° to 780° C.; Cu with 10 to 15% by weight Mn and 1 to 4% by weight Ni with working temperatures between 850° and 1000° C. These alloys are suitable to form the outside layer of the three-layer composite solder.

All percentage values herein are by weight.

The solder of the plated-on layer and the precipitation-hardenable alloy of the middle layer must always be selected and combined in such a manner that there is a temperature difference of at least 50° C. between the working temperature of the solder and the melting temperature of the intermediate layer.

The following table shows examples of suitable multilayer solders with data about the working temperature, ageing temperature and the attained shearing resistance of the solder layer.

As used herein the term "hard materials" designates those widely known hard metallic substances used to make cutting work tools, especially metal cutting tools. Typical examples are the carbides and tungsten-chromium alloys. See for example "Principles of Metal Cutting and Machinability" Section 17 in the Tool Engineers Handbook, McGraw-Hill 1949, pages 302–356, especially the table on p. 329, incorporated herein.

A ceramics/metal composite tool material, also known as "cermets" are widely known and described in Kirk-Othmer, supra, 3rd Edition, page 299–303, incorporated herein.

Ceramics and metal alloy work tool materials are therefore encompassed by the use of the term "hard cutting material" as used herein.

Further variations and modifications of the foregoing will be apparent to those skilled in the art and are intended to be encompasses by the claims appended hereto.

| Solder (% by weight) | Working Temperature (°C.) | Intermediate layer Composition (% by weight) | Melting Point (°C.) | Ageing | Shear resistance |
| --- | --- | --- | --- | --- | --- |
| Ag 27.5 Cu 20.5 Zn 2.5 Mn 0.5 Ni | 690 | Cu 20 Mn 20 Ni | 1045 | 370° C./4 h | 200–350 |
| Ag 27.5 Cu 20.5 Zn 2.5 Mn 0.5 Ni | 690 | Cu 7.65 Mn 2.35 Si | 990 | 400° C./1 h | 200–350 |
| Ag 27.5 Cu 20.5 Zn 2.5 Mn 0.5 Ni | 690 | Cu 0.6 Cr | 1080 | 550° C./10 h | 200–300 |
| Ag 26 Cu 6 In 2 Ni 2 Mn | 770 | Cu 0.66 Hf 0.04 Zr | 1085 | 550° C./1 h | 200–300 |
| Ag 26 Cu 6 In 2 Ni 2 Mn | 770 | Cu 0.2 Zr | 1080 | 500° C./1 h | 200–300 |
| Ag 26 Cu 6 In 2 Ni 2 Mn | 770 | Cu 1 Ti | 1080 | 450° C./1 h | 200–300 |
| Cu 27 Ag 20 Zn 9.5 Mn 5.5 Ni | 840 | Cu 7.5 Ni 8 Sn | 1090 | 370° C./4 h | 200–300 |
| Ag 27.5 Cu 20.5 Zn 2.5 Mn 0.5 Ni | 690 | Cu 15 In | 820 | 320° C./2.5 h | 200–300 |
| Ag 27.5 Cu 20.5 Zn 2.5 Mn 0.5 Ni | 690 | Cu 2 Be | 890 | 325° C./1 h | 250–350 |

-continued

| Solder (% by weight) | Working Temperature (°C.) | Intermediate layer Composition (% by weight) | Melting Point (°C.) | Ageing | Shear resistance |
|---|---|---|---|---|---|
| Ag 27.5 Cu 20.5 Zn 2.5 Mn 0.5 Ni | 690 | Cu 2 Ni 0 6 Si | 1095 | 500 ° C./1 h | 200–350 |

We claim:
1. A method for soldering a hard cutting material onto a base substrate of steel to make a work cutting tool comprising selecting a three-layer solder composite in which the middle layer consists of a copper alloy or nickel alloy, said middle layer being provided on each side thereof with a layer of a hard solder whose working temperature is located at least 50° C. below the melting point of the copper alloy or nickel alloy of the middle layer, said copper alloy and nickel alloy being a precipitation-hardenable copper layer or nickel layer, soldering said composite onto said steel and said hard cutting material at a soldering temperature, preventing melting of the middle layer during the soldering by selecting the working temperature and the alloy so as to avoid melting, and thereafter tempering by heating at 250° to 550° C. following the soldering for a precipitation hardening of the middle layer.
2. The method according to claim 1 wherein said middle layer is an alloy of copper and a member selected from the group consisting of indium, chromium, beryllium, nickel, magnesium, scandium, silicon, tin, titanium, zirconium, hafnium, magnesium and mixtures thereof.
3. The method according to claim 1 wherein said middle layer is an alloy of nickel and a member selected from the group consisting of aluminum, copper, titanium, beryllium and mixtures thereof.
4. The method according to claim 1 wherein said middle layer is selected from the group consisting of:
Cu with 15 to 25% by weight Mn and 15 to 25% by weight Ni
Cu with 7 to 8.5% by weight Mn and 2 to 3% by weight Si
Cu with 0.4 to 2% by weight Cr
Cu with 0.4 to 1% by weight Hf and 0.3 to 0.5% by weight Zr
Cu with 0.1 to 0.4% by weight Zr
Cu with 0.5 to 2% by weight Ti
Cu with 6 to 10% by weight Ni and 6 to 10% by weight Sn
Cu with 1 to 2% by weight Ti, 2 to 3% by weight Si and 0.3 to 0.8% by weight Cr
Cu with 0.5 to 20% by weight In
Cu with 1 to 4% by weight Be
Cu with 1 to 3% by weight Ni and 0.4 to 0.8% by weight Si or nickel alloys
Ni with 2 to 6% by weight Al and 1 to 2% by weight titanium
Ni with 20 to 40% by weight Cu and 2 to 4% by weight Al
Ni with 1 to 3% by weight Be.
5. The method according to claim 1 wherein said outside layer is selected from the group consisting of:
Ag with 25 to 34% by weight Cu, 18 to 25% by weight Zn, 1 to 5% by weight Mn and 0.3 to 1% by weight Ni with a working temperature of 650° to 700° C.;
Ag with 20 to 35% by weight Cu, 4 to 8% by weight In, 1 to 3% by weight Ni and 1 to 3% by weight Mn with working temperatures of 710° to 800° C.;
Cu with 15 to 20% by weight Ag, 20 to 30% by weight Zn, 15 to 20% by weight Cd, 2 to 3% by weight Mn and 0.3 to 0.7% by weight Ni with working temperatures of 570° to 780° C.;
and Cu with 10 to 15% by weight Mn and 1 to 4% by weight Ni with working temperatures between 850° and 1000° C.
6. A method for soldering on hard substances in accordance with claim 1, wherein a copper alloy or nickel alloy is used which can be precipitation hardened as the middle layer and which has the composition selected from the group consisting of:

| 20% Mn | 7.65% Mn | 1% Ti | 2% Ni |
|---|---|---|---|
| 20% Ni | 2.35% Si | balance Cu | 0.6% Si |
| balance Cu | balance Cu | | balance Cu |
| 4% Al | 0.6% Cr | 0.2% Zr | 0.66% Hf |
| 1.5% Ti | balance Cu | balance Cu | 0.04% Zr |
| balance Ni | | | balance Cu |

7. A method for soldering according to claim 1 wherein said hard cutting material is a cermet or a carbide tool.
8. A three-layer solder composite comprising a middle layer of a copper alloy or nickel alloy, said middle layer having two opposite surfaces and being provided on each surface thereof with a layer of a hard solder having a melting point of the copper alloy or nickel alloy wherein said hard solder is selected from the group consisting of:
Ag with 25 to 34% by weight Cu,, 18 to 25% by weight Zn, 1 to 5% by weight Mn and 0.3 to 1% by weight Ni with a working temperature of 650° to 700° C.;
Ag with 20 to 35% by weight Cu, 4 to 8% by weight In, 1 to 3% by weight Ni and 1 to 3% by weight Mn with working temperatures of 710° to 800° C.;
Cu with 15 to 20% by weight Ag, 20 to 30% by weight n, 15 to 20% by weight Cd, 2 to 3% by weight Mn and 0.3 to 0.7% by weight Ni with working temperatures of 570° to 780° C.;
and Cu with 10 to 15% by weight Mn and 1 to 4% by weight Ni with working temperatures between 850° and 1000° C., said copper alloy and said nickel alloy being precipitation hardenable, said hard solder having a working temperature of at least 50° C. below the melting point of said copper or nickel alloy.
9. The three-layer solder composite according to claim 8 wherein said middle layer is selected from the group consisting of:
Cu with 15 to 25% by weight Mn and 15 to 25% by weight Ni
Cu with 7 to 8.5% by weight Mn and 2 to 3% by weight Si
Cu with 0.4 to 2% by weight Cr
Cu with 0.4 to 1% by weight Hf and 0.3 to 0.5% by weight Zr
Cu with 0.1 to 0.4% by weight Zr
Cu with 0.5 to 2% by weight Ti Cu with 6 to 10% by weight Ni and 6 to 10% by weight Sn Cu with 1 to 2% by weight Ti, 2 to 3% by weight Si and 0.3 to 0.8% by weight Cr Cu with 0.5 to 20% by weight In Cu with 1 to 4% by weight Be Cu with 1 to 3% by weight Ni and 0.4 to 0.8% by weight Si or nickel alloys Ni with 2 to 6% by weight Al and 1 to 2% by weight titanium Ni with 20 to 40% by weight Cu and 2 to 4% by weight Al Ni with 1 to 3% by weight Be.

* * * * *